United States Patent
Chew

(10) Patent No.: US 7,889,232 B2
(45) Date of Patent: Feb. 15, 2011

(54) METHOD AND SYSTEM FOR SURVEILLANCE OF VESSELS

(75) Inventor: Khien Meow David Chew, Singapore (SG)

(73) Assignee: Stratech Systems Limited, The Strategy (SG)

( * ) Notice: Subject to any disclaimer, the term of this patent is extended or adjusted under 35 U.S.C. 154(b) by 1495 days.

(21) Appl. No.: 10/548,566

(22) PCT Filed: Jun. 22, 2005

(86) PCT No.: PCT/SG2005/000205

§ 371 (c)(1), (2), (4) Date: Sep. 12, 2005

(87) PCT Pub. No.: WO2005/125209

PCT Pub. Date: Dec. 29, 2005

(65) Prior Publication Data

US 2006/0244826 A1 Nov. 2, 2006

(30) Foreign Application Priority Data

Jun. 22, 2004 (SG) .............................. 200403679-4

(51) Int. Cl.
*H04N 7/18* (2006.01)
(52) U.S. Cl. ................ 348/159; 348/148; 348/143; 348/153
(58) Field of Classification Search ............ 348/159, 348/148, 143, 153, 169
See application file for complete search history.

(56) References Cited

U.S. PATENT DOCUMENTS 6,215,519 B1 * 4/2001 Nayar et al. ............... 348/159

2005/0185053 A1 8/2005 Berkey et al.

FOREIGN PATENT DOCUMENTS

WO WO 2004/038659 A2 5/2004

(Continued)

OTHER PUBLICATIONS

Jai A-S, Coastal Surveillance [online], Mar. 12, 2004, [Retrieved on Sep. 9, 2005] retrieved from the Internet: <URL:http://www.jai.com/systems/news_show.asp?id=143&sprog=uk Whole document.

(Continued)

*Primary Examiner*—Houshang Safaipour
(74) *Attorney, Agent, or Firm*—Stephen A. Bent; Foley & Lardner LLP

(57) ABSTRACT

A surveillance system and method for vessels. The system comprises surveillance means for surveying a waterway; vessel detection means for determining the presence and location of a vessel in the waterway based on information from the surveillance means; camera means for capturing one or more images of the vessel; image processing means for processing the images captured by the camera means for deriving surveillance data; wherein the camera means captures the vessel images based on information from the vessel detection means, the surveillance data from the image processing means, or both. The images can be used to classify and identify the vessel by name and category, possibly also to compare the category with that previously registered for a vessel of this name. The vessel can be tracked, including by speed and direction until it leaves the surveyed waterway.

26 Claims, 5 Drawing Sheets

FOREIGN PATENT DOCUMENTS

WO  WO 2005/050972 A2  6/2005

OTHER PUBLICATIONS

Jai A-S, Advanced surveillance [online], Mar. 22, 2003, [Retrieved on Sep. 9, 2005] retrieved from the Internet: <URL:http://www.jai.com/db_brochures/advanced.pdf Whole document.

J.G. Sanderson et al., "Target Identification in complex maritime scenes", Image Processing and Its Applications, 1997, Jul. 14-17, 1997, vol. 2, pp. 463-467, ISBN: 0-85296-692-X, Accession No. 5704429.

* cited by examiner

METHOD AND SYSTEM FOR SURVEILLANCE OF VESSELS

FIELD OF THE INVENTION

The invention relates to a method and system for surveillance and tracking of vessels and boats in waterway. For instance, the system may be used to automatically and in real-time detect and track the position, course and speed, trajectory, feature extraction and anomalous activity recognition of numerous vessels in ports and waterways.

BACKGROUND ART

With increases in global trade, ports, channels and other waterways are becoming increasingly busy. Additionally, ship owners, port authorities and others are increasingly trying to reduce delays in getting vessels from port to port and in getting the vessels into and out of port. Further, with the current and future concerns over terrorist threats, port, naval and other authorities are increasingly concerned about keeping track of vessels, flying and slow air-borne craft like helicopters that come within the field of view of surveillance.

Current surveillance systems for tracking ships are radar-based. An operator has a screen with a number of objects on it representing different ships. Either, the operator labels the object having identified the ship through verbal communication with the crew or else ships may be labelled automatically after having been identified by transponders on board the ships (e.g. the Automatic Identification System (AIS)). However, such existing systems tend to have blind spots, inability to measure vessel height inability to accurately classify the vessel and resolution limitations.

SUMMARY

In accordance with a first aspect of the present invention there is provided a surveillance system for vessels, the system comprising surveillance means for surveying a waterway; vessel detection means for determining the presence and location of a vessel in the waterway based on information from the surveillance means; camera means for capturing one or more images of the vessel; image processing means for processing the images captured by the camera means for deriving surveillance data; wherein the camera means captures the images based on information from the vessel detection means, the surveillance data from the image processing means, or both.

The system may further comprise tracking means for tracking a vessel's movement through the waterways based on the surveillance data derived by the image processing means.

The surveillance data may comprise a vessel name extracted from the images of the vessel captured by the camera means.

The surveillance data may comprise a vessel shape and/or other vessel characteristics extracted from the images of the vessel captured by the camera means.

The surveillance data may comprise a vessel type/category determined from said vessel shape, height, length and/or other vessel characteristics extracted from the images of the vessel captured by the camera means.

The surveillance data may comprises one or more of a group consisting of a speed, a course, and a trajectory of the vessel extracted from the images of the vessel captured by the camera means.

The surveillance data may comprise behaviour data indicative of a behaviour of a vessel including abnormal behaviour.

The system may further comprise checking means for checking the surveillance data derived by the image processing means against reference data in a database of the system.

The surveillance means may comprise one or more scanning cameras and the vessel detection means is operable to determine the presence and location of the vessel based on image processing of images captured by the scanning cameras.

The camera means may comprise one or more zoom cameras.

In accordance with a second aspect of the present invention there is provided a surveillance system for vessels, the system comprising a surveillance device for surveying a waterway; a detector for determining the presence and location of a vessel in the waterway based on information from the surveillance means; a camera for capturing one or more images of the vessel; an image processor for processing the images captured by the camera means for deriving surveillance data; wherein the system processes information from the detector, information from the surveillance device, surveillance data from the image processor or any combinations of these information/data.

In accordance with a third aspect of the present invention there is provided a method of surveillance vessels, the method comprising surveying a waterway; determining the presence and location of a vessel in the waterway based on information from the surveillance of the waterway; capturing one or more images of the vessel; processing the images captured for deriving surveillance data; wherein the images are captured based on the determined presence and location, the surveillance data, or both.

The method may further comprise tracking a vessel's movement through the waterways based on the derived surveillance data.

The surveillance data may comprise a vessel name extracted from the images of the vessel.

The surveillance data may comprise a vessel shape, size and/or other vessel characteristics extracted from the images of the vessel.

The surveillance data may comprise a vessel category/type determined from said vessel shape and/or other vessel characteristics extracted from the images of the vessel.

The surveillance data may comprise one or more of a group consisting of a speed, a course, and a trajectory of the vessel extracted from the images of the vessel.

The surveillance data may comprise behaviour data indicative of a behaviour of a vessel including abnormal behaviour.

The method may further comprise checking the surveillance data derived against reference data.

The surveying may comprise utilising one or more scanning cameras and determining the presence and location of the vessel based on image processing of images captured by the scanning cameras.

The capturing of the images of the vessel may comprise utilising one or more zoom cameras.

In accordance with a fourth aspect of the present invention there is provided a data storage medium having stored thereon computer readable code means for instructing a computer to execute a method of surveillance vessels, the method comprising surveying a waterway; determining the presence and location of a vessel in the waterway based on information from the surveillance of the waterway; capturing one or more images of the vessel; processing the images captured for deriving surveillance data; wherein the images are captured based on the determined presence and location, the surveillance data, or both.

INTRODUCTION TO THE DRAWINGS

Embodiments of the invention are described by way of non-limitative example, with reference to the accompanying drawings, in which:—

DESCRIPTION

The embodiment of a Vessel Image Processing System (VIPS) described herein is a video imaging based surveillance system which automatically, and in real-time, detects and tracks the position, course and speed of vessels entering and using ports and waterways. The system circumvents problems associated with existing radar-based surveillance systems, such as blind spots, inability to identify vessel and resolution limitations, thereby enhancing the capabilities of port vessel traffic management systems and port operators.

The embodied system employs image processing techniques based on statistical and/or artificial intelligent technology to detect and track vessels, and extract vessel information such as salient characteristics (e.g. width, length, height, air draught, structural outline, physical profile), operating states (e.g. underway, at anchor), vessel name and recognise normal and abnormal behaviour. Some of these techniques include background subtraction and temporal frame differencing for vessel object detection and tracking, dynamic background monitoring and adaptation (in which the background reference frames used for background subtraction are being updated regularly or whenever there are changes in the scene, illumination conditions etc . . . ) and optical flow techniques to filter out false alarms due to motion clutter.

Figure 6:
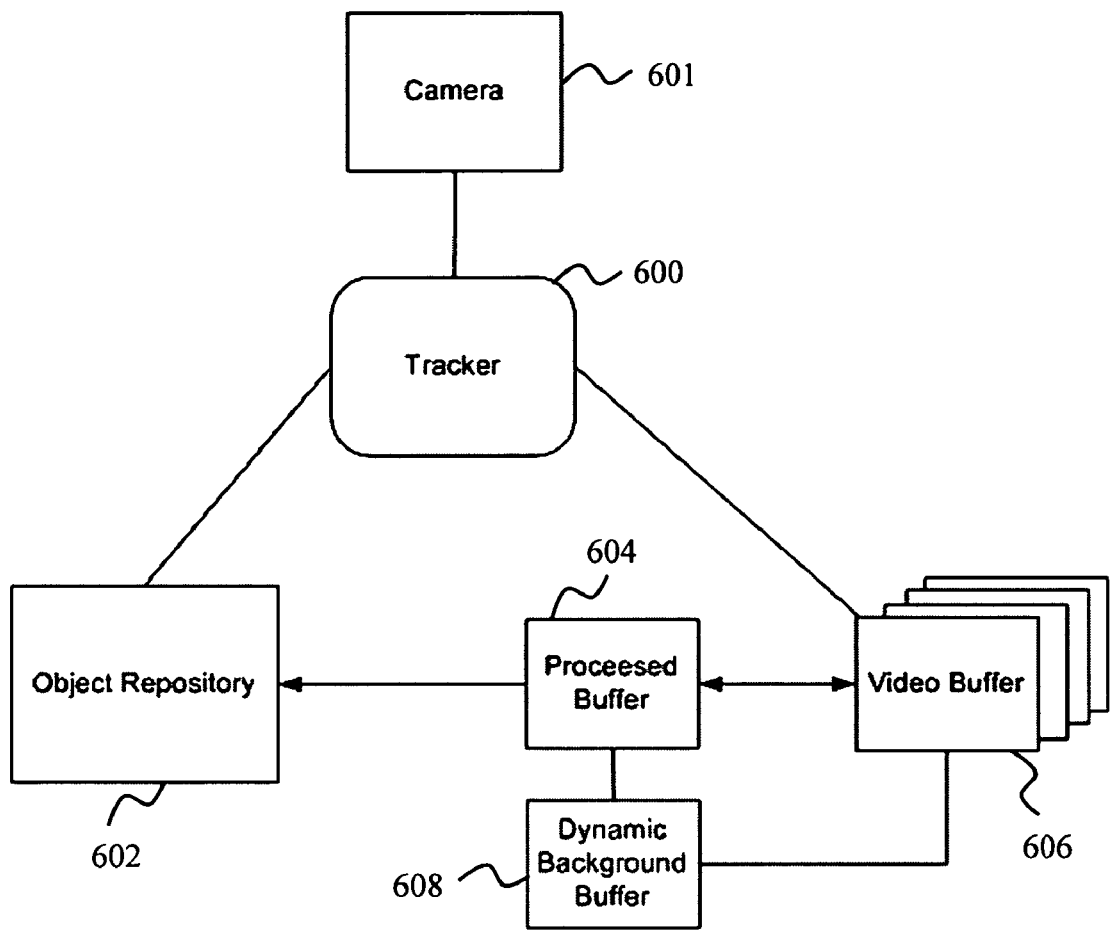
FIG. 6 is a schematic drawing illustrating an overview of a tracking process and system in one embodiment.
Figure 7:
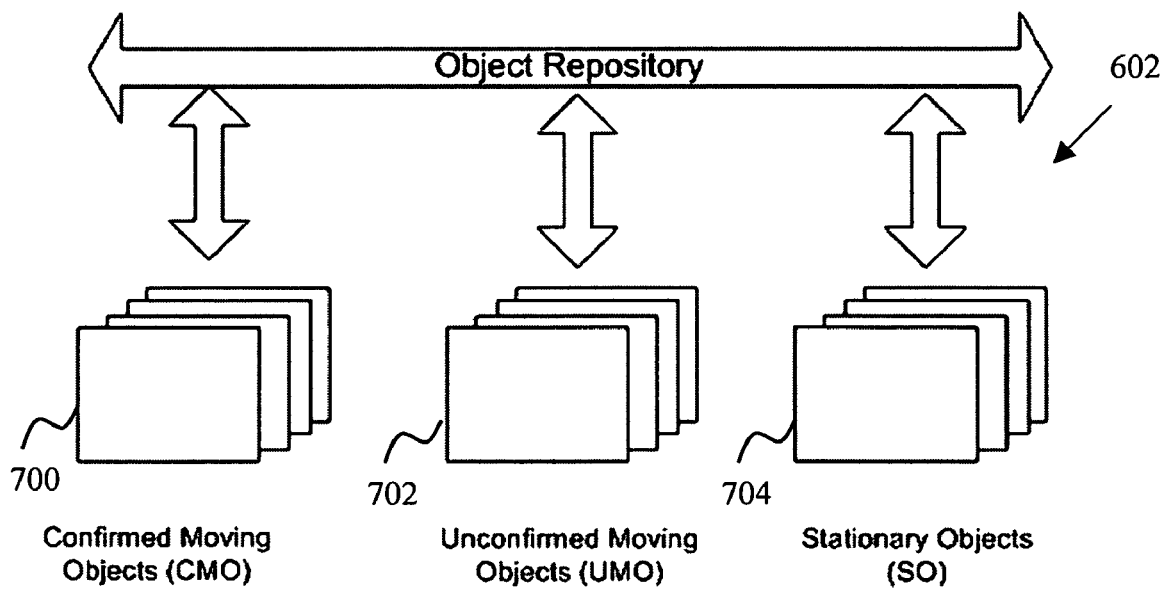
FIG. 7 is a schematic drawing illustrating an object repository maintainance method and system in one embodiment.
Figure 8:
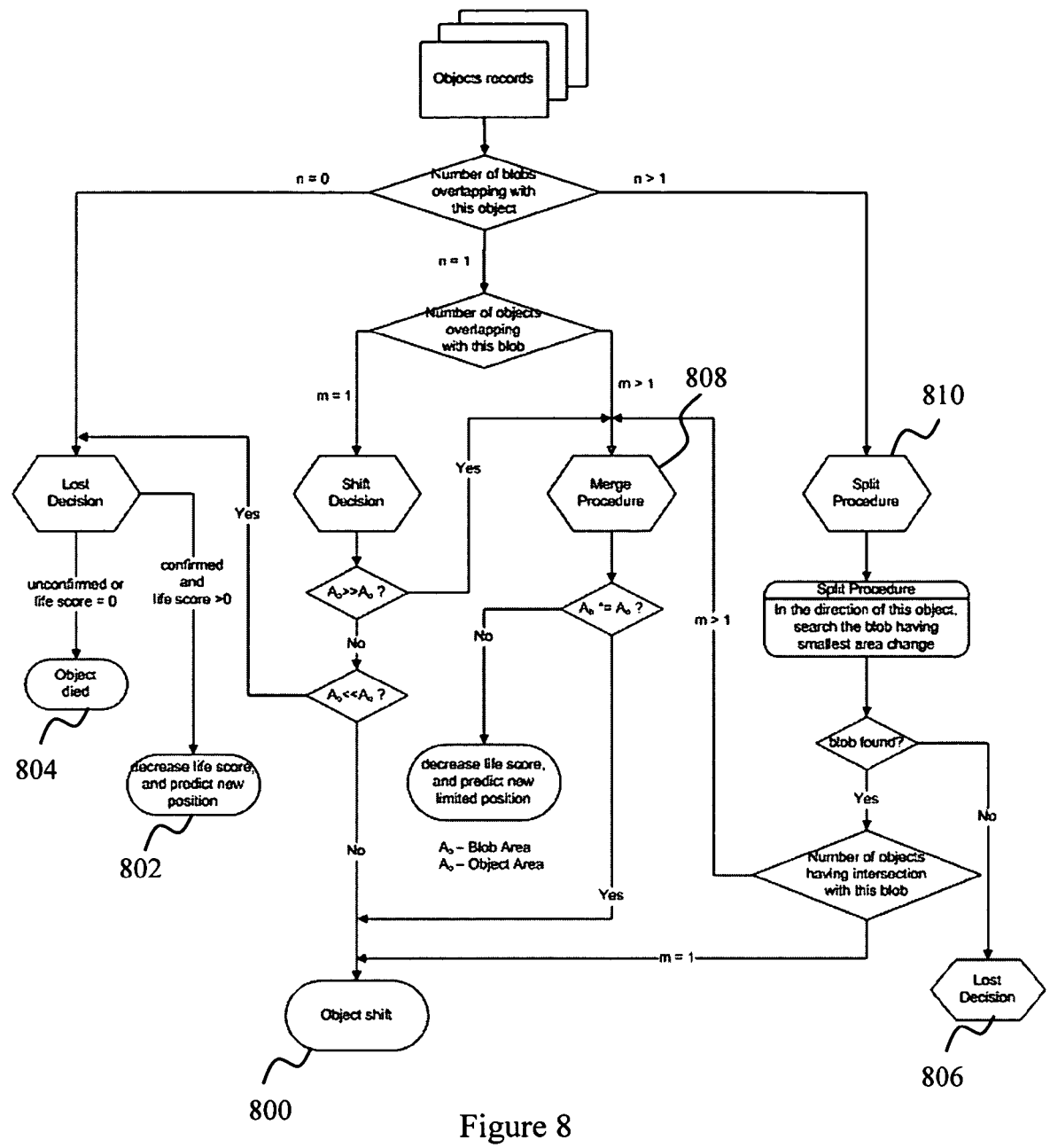
FIG. 8 is a flowchart illustrating an object and blob analysis in one embodiment.

One or more scanning camera views of a waterway such as a port are processed to determine whether a vessel is or vessels are present. FIGS. 6, 7 and 8, described below in more detail, show schematic drawings and flowcharts illustrating vessel detection, tracking and blob/object analysis in an example embodiment. The actions involved for manipulating those tracking objects include Add, Update, Delete and Query.

Where a vessel is detected, one or more zoom cameras are directed to the position of the vessel to take close-up images of the vessel. The close-up images are used to identify the vessel by name and category/type; if the vessel's name is known, then possibly also to verify the category/type with that previously registered for a vessel of the same name. The vessel is or can be tracked, including by speed and direction monitored continuously or periodically, until it leaves the surveyed waterway or until some preset criteria is met. The vessel speed and direction are obtained by blob analysis, vessel object trajectory analysis and possibly with trajectory smoothing using kalman filtering or extended kalman filtering. A detected vessel may be tracked first using the scanning camera views before additional close-up images of the vessel are acquired. Certain criteria e.g. by location, behaviour (based on trajectory, heading, speed, orientation etc), name or category can also be established, whereby vessels satisfying these criteria are not processed further (i.e., ignored) or selected to be given more attention or processed (e.g., category or characteristics determined via close-up images) further. Some of these behaviours include vessels anchoring or anchored, vessel exceeding speed limits or travelling too slowly, vessel orientation against normal traffic flow etc . . .

Figure 1:
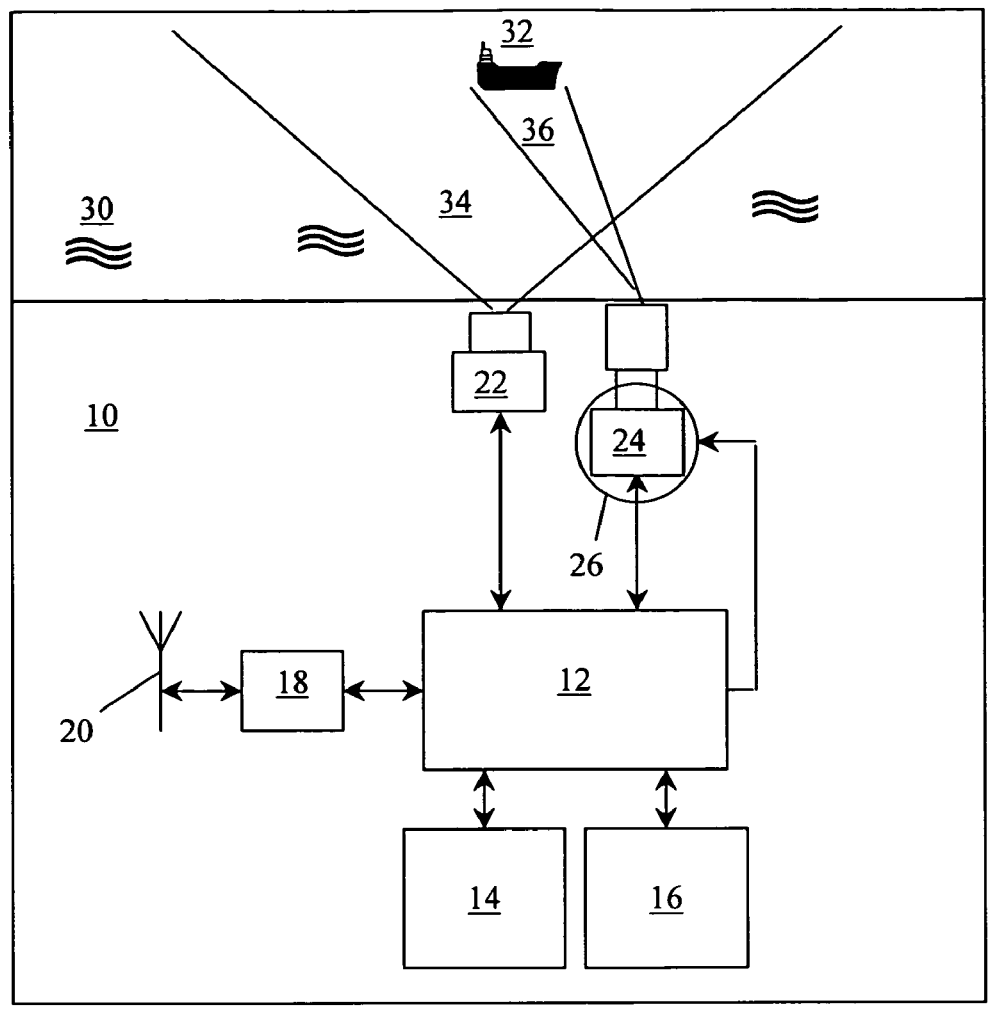
FIG. 1 is a schematic block diagram of the components of the system of an embodiment.

FIG. 1 is a schematic block diagram of the components of the system 10 looking outward at waterway 30 of this embodiment. A central controller 12 has access to an image database 14 and an information database 16 for retrieving and storing images and information. The controller 12 is also linked to a transmitter/receiver 18, connected to an aerial 20, for querying and receiving data from vessels (e.g. from AIS and mobile radio communications), as well as for other communications. The system also includes one or more scanning cameras 22 and one or more zoom cameras 24 mounted on pan-tilt units 26. The cameras can be still picture or video cameras. The outputs from the still/video cameras 22, 24 are connected as inputs to the controller 12 and at least the one or more zoom cameras 24 are also connected to receive control instructions from the controller 12. The input instructions to the pan-tilt units 26 are also provided from the controller 12.

The scanning camera 22 and the zoom camera 24 are set up at a vantage point with a good view of the entire waterway under surveillance. In some situations, it may be useful to have another or more zoom cameras at different vantage points. In other situations, no single vantage point may be able to provide good views of the entire waterway under surveillance, and will require one or more additional scanning cameras 22 at additional vantage points, usually each scanning camera 22 having at least one associated zoom camera 24. The connections between the cameras and the controller may be wired, wireless transmissions, RF or other means of communications.

The scanning camera 22 is a camera of fixed/vary focal length and usefully of mega pixels resolution. Typically, the scanning camera 22 is analog/digital, using a Charge-Coupled Device (CCD) or Complementary Metal Oxide Semiconductor (CMOS) sensor. Thermal or active laser imager could also be used as the scanning camera. In most situations, the scanning camera 22 does not need to move, although there may be locations where the scanning camera 22 would be mounted to pan and tilt around in order to view the entire area under surveillance. In such situations, the panning around could be automatic and continuous or could be controlled by the controller 12. The scanning camera usually takes in the normal or wide angle field of view of the waterway, for instance with angular field of view of 60 degree over distance of 5 km to provide coverage area of 13 km$^2$. The effective area of coverage and distance of a scanning camera vary depends on a number of factors, including the type of scanning camera used, installation height, its panning range, image resolution, lens focal length etc.

The zoom camera 24 is used for vessel details extraction and tracking (e.g. vessel name, vessel category). The zoom camera 22 does not need to have a normal or wide angle, but can have fairly narrow view (small angle of view) and is usually telescopic, as the normal or wide angle image shots are provided by the scanning camera 22. Alternatively the zoom camera can also have a normal or wide angle field of view to serve as backup for the scanning camera. The zoom camera 24 is also usefully of high resolution, typically digital and using a CCD or CMOS sensor. A thermal imager or active laser imager could also be used as a zoom camera. The zoom lens is motorised and controlled by the controller 12. The pan-tilt unit 26 is generally high-precision, capable of sub-degree accuracy, to allow the zoom camera 24 to be directed more precisely and zoomed into particular vessel. Although a pan and tilt hardware unit 26 is preferably used, the same pan and tilt functions can also be achieved by some other means (e.g. digital pan/tilt/zoom).

Although, in this embodiment, the scanning and zoom cameras are separate, in other embodiments the functions of the two cameras can be combined into a single camera which is capable of providing both normal or wide angle and telescopic close-up views.

Figure 2:
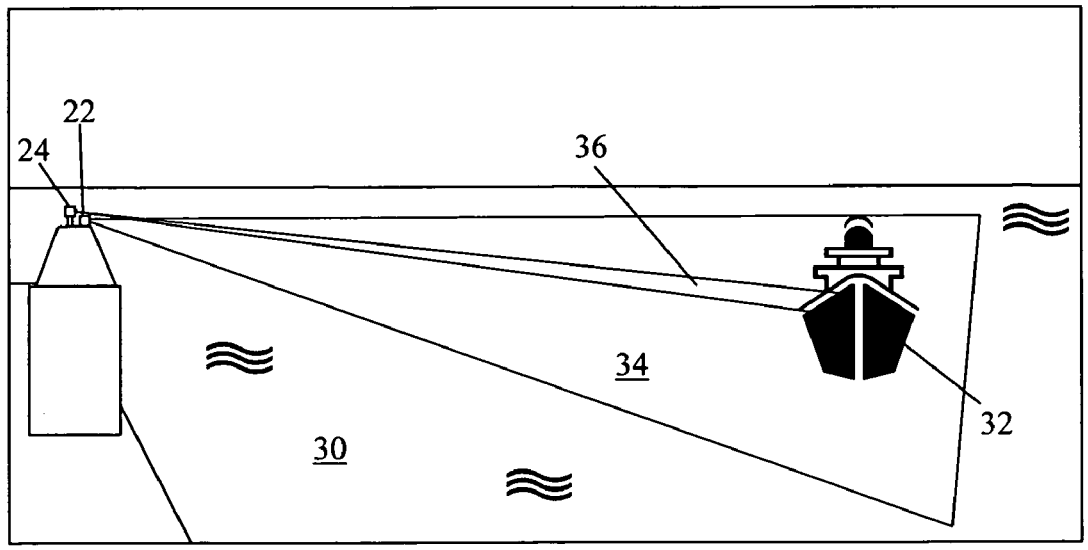
FIG. 2 is a schematic view of a waterway overlooked by two cameras 22 and 24.

FIG. 2 is a schematic view of a waterway 30 overlooked by the scanning camera 22 and the zoom camera 24, according to an example embodiment. A vessel 32 passing through the waterway 30 falls within the scanning image region 34 of the scanning camera 22, and the zoom image region 36 of the zoom camera 24 can be directed at the vessel 32 for vessel identification (e.g. vessel name 34), classification and/or tracking. For reading the vessel's name from its image may be achieved automatically (such as using Optical Character Recognition techniques), manually or done automatically but verified manually, depending on a number of factors, including the readability and conditions of the text characters and/or symbols on the vessel, the illumination conditions and the accuracy capability of the optical character recognition system used.

The controller 12 has image processing software and hardware which include frame grabber card (e.g. Matrox) for converting analog to digital video and microprocessor for image processing. The controller software has the modules to perform the system's intelligent functions, e.g., vessel detection, tracking, computation of vessel speed, heading, size, location (based on image blob analysis and image mapping to geographical coordinates), as well as control of the pan-tilt unit and zoom camera, as required.

Figure 3:
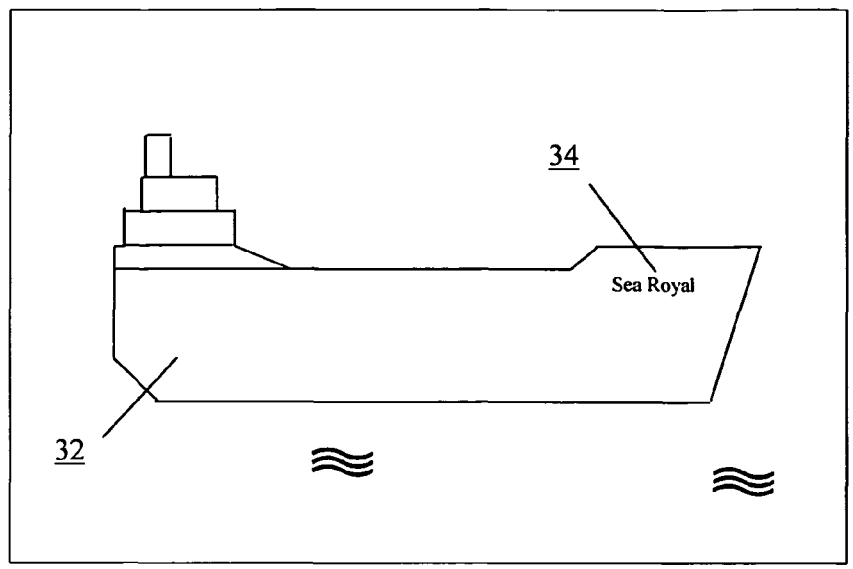
FIG. 3 is a close up image of a vessel.

The vessel image database 14 contains stored images of vessels. The images can be limited to just those of vessels currently within the waterway or port, or under surveillance, and/or the database can additionally include images of vessels that were encountered/tracked in the same waterway in the past or images of vessels acquired from any where in the world. The images of a vessel can include views of the whole vessel and/or close-up images, from one or more angles, for instance of a close-up image of the vessel with its name on its hull, as shown in FIG. 3. When a vessel is being tracked, images are continuously being taken (and processed) and/or stored in real time.

The vessel information database 16 stores information related to the classification and identification of vessels in the surveillance area, the time of detection, vessel position (in latitude and longitude or other co-ordinate systems as required), vessel size, shape/profile, vessel category/type, speed, course etc. Some of the information can be gleaned from external sources like shipping databases or registers of shipping or port authorities vessel database. The vessel identification information can be just an assigned number or label for current surveillance/tracking purposes, which could re-used once the vessel with that identification label has moved beyond the surveillance area. Alternatively or additionally, the identification can be a unique number and/or name assigned to that vessel whenever it visits the same waterway. The unique identifier may even be consistent with that used by other naming systems, possibly even globally.

Figure 4:
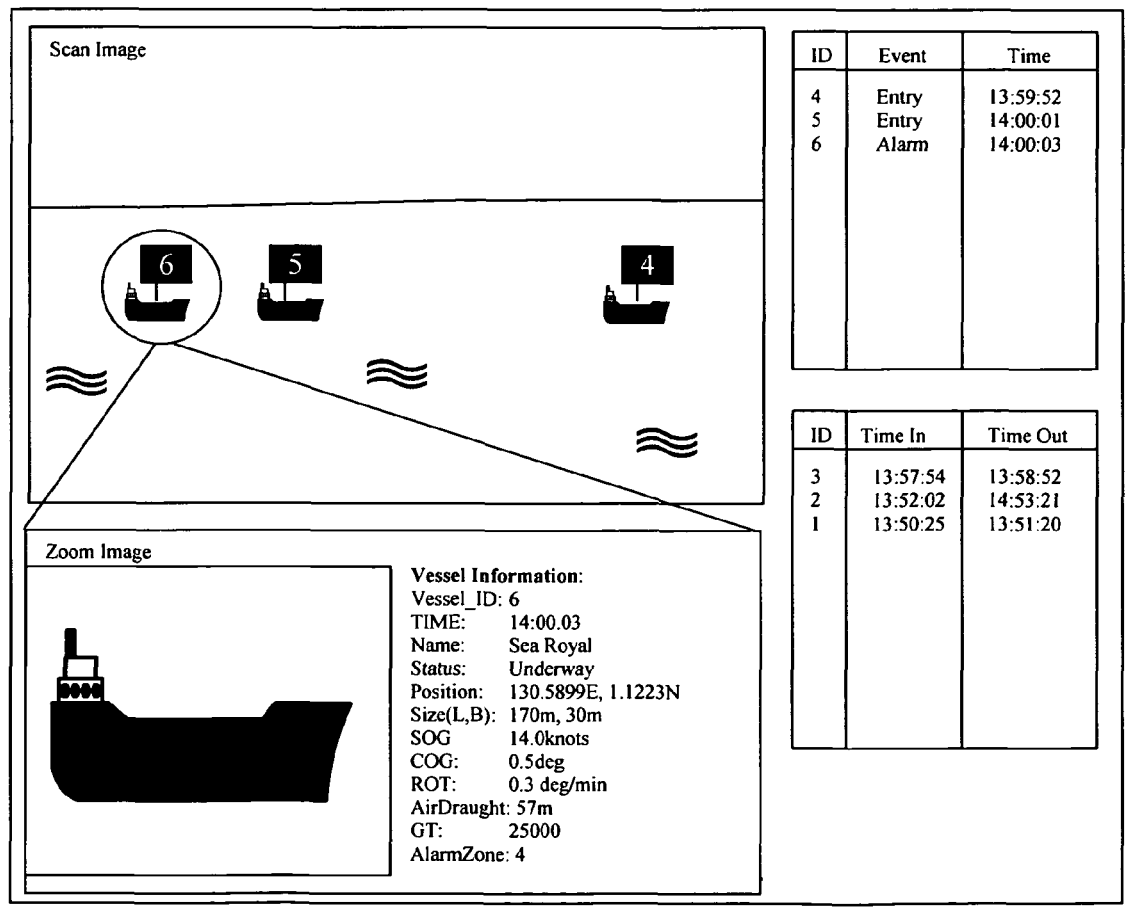
FIG. 4 is a view of a graphical user interface in one embodiment.

The system can provide a user-friendly graphical user interface (GUI). In an operational system, the screen displays can be easily customised to suit the varying needs and features required by the users, for instance as shown in FIG. 4. For example, when an operator clicks on a particular vessel appearing in the GUI, the system displays its location on an electronic geographical map (e.g., electronic navigation chart) and also the navigation status, position, size (length and beam), speed over ground (SOG), course over ground (COG), rate of turn (ROT), air draught, gross tonnage (GT), alarm zone and identity of the vessel name. The operator can have a visual view of the entire port waters or waterway or selected sections, instead of just radar plots of some regions of the port. By rubber-banding a specific area and selecting a zoom-in function, the system can display vessels in that region in greater resolution.

Figure 5:
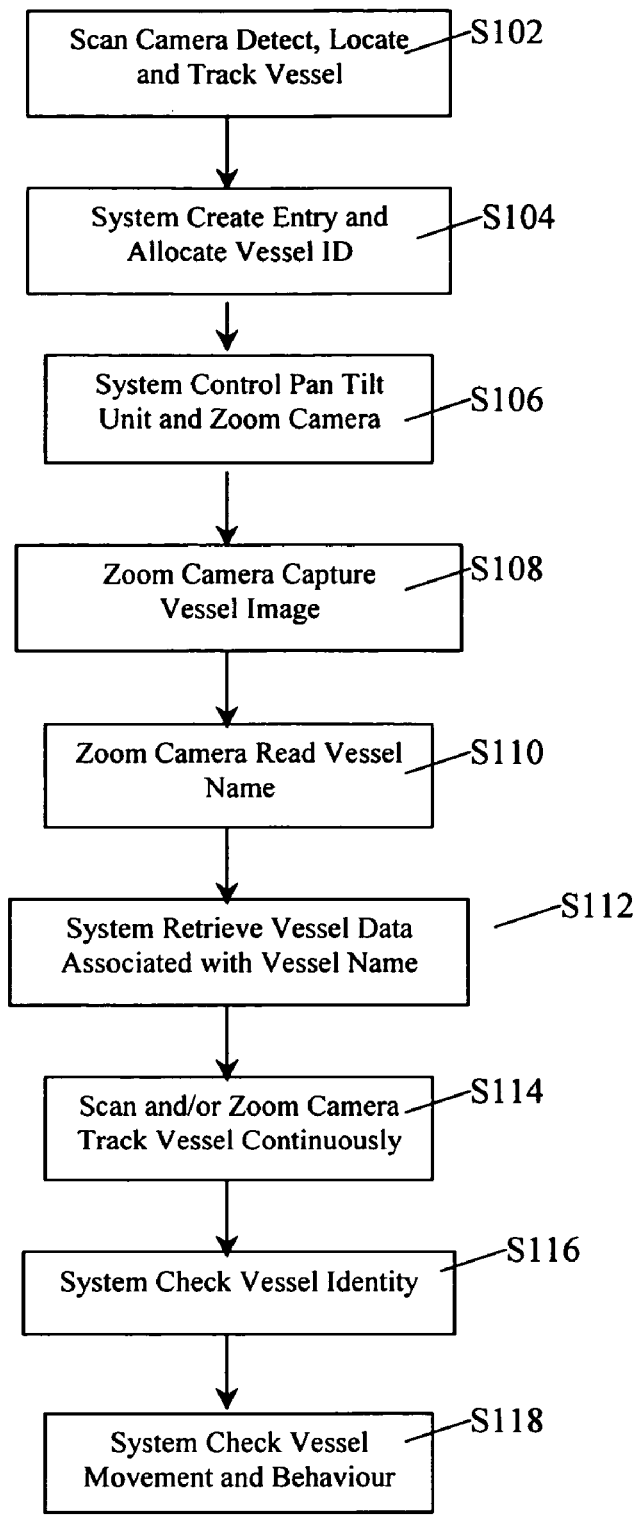
FIG. 5 is a flowchart illustrating an operation of an embodiment of the invention.

The operation of the system of FIG. 1 in an example embodiment is now described with reference to the flowchart of FIG. 5. Images from the scanning camera 22 are constantly processed. Once a vessel enters or moves within the scanning range and area of coverage of the scanning camera 22, image processing software in the controller 12 detects, locate and track the presence of the vessel (step S102), an entry in the vessel information database is created and an unique ID number is assigned to the vessel throughout the tracking and its location is determined (step S104). The pan-tilt unit 26 of the zoom camera 24 is directed to point the zoom camera 24 at the vessel (step S106). The scanning and zoom camera images are pre-calibrated to the reference geographical coordinate system by looking at three or more fixed points with known co-ordinates in the camera view and the digital map or electronic navigation chart, in the example embodiment. Thus the position of the vessel object in the camera images can be mapped to the reference geographic coordinate system to determine its geographic position. The lens of the zoom camera 24 zooms in to enable the camera to take one or more pictures of the vessel, one of which may be a close-up image of the name region of the vessel (step S108). For the purpose of determining the correct zoom ratio or focal length to capture the whole vessel within an image view in step S108, an approximation of the size of the vessel could be computed from information derived from the scanning camera images. A possible alternative approach is to base the zoom ratio or focal length on processing of images from the zoom camera as it zooms into the vessel. Thus the zoom camera will continue to zoom in and will only stop zooming once the vessel object size reaches a threshold. The position of the vessel name for step S108 is based on the assumption that all vessels have their name at the bow and also across the stern. Depending on where the vessel is first detected, the appropriate position can be determined based on the knowledge of vessel heading, speed, rate of turn and its predicted position.

The vessel name is read (step S110) from the image obtained at step S108. This name is added to the entry in the vessel information database. The database is searched to see if there is already any information for a vessel with this name, and any information associated to the vessel name is retrieved (step S112). In addition the vessel category or type information could also be used in the database searching. Alternatively or additionally, the vessel could provide details as to its identity by way of a transponder (e.g., using AIS or other GPS based transponder). Again, the information database would be searched to see if there is already any information for a vessel with this name.

Refreshed images from the scanning camera 22 are processed over time to keep a track of the vessel parameters, to provide real-time information as to the position, heading and speed of the vessel (step S114). As this processing is carried out for any and all vessels in range, the vessel tracking can be used to determine vessel navigation channel or waterway vessel traffic volume, density and/or occupancy and if vessels are on collision courses, such that they can be warned accordingly in advance. Tracking can also be used to determine if the vessel is likely to run aground based on depth and navigation information from navigation chart or Electronic Navigation Chart (ECN) or Electronic Navigation Chart Information System (ECDIS).

Alternatively, the progress of each vessel can be based on images from the scanning 22 and zoom camera 24, since the position of each vessel at any time can be determined from the position and direction of the zoom camera, the zoom ratio or focal length, the pan angle, the tilt level and the height of the water at any time.

Based on the information that is retrieved, the identity of the vessel is checked (step S116). The behaviour of the vessel is also checked (step S118).

With reference to FIG. 6, the object tracking is processed by a Tracker module 600 coupled to a camera module 601. The tracker module 600 consists of Object Repository 602 coupled to a Processed Buffer 604 coupled to a Video Buffer 606. The processed buffer 604, coupled to a latest dynamic background buffer 608, which is in turn coupled to the video buffer 606, including the detected objects are updated into the object repository 600. With reference to FIG. 7, the object repository 602 consists of three types of objects, Confirmed Moving Objects 700, Unconfirmed moving objects 702 and Stationary Objects 704. All different types of objects will be passing through an object and blob analysis, illustrated in the flowchart in FIG. 8, for decision. The decision may consist of object shift 800, predict new position 802, object died 804, or lost decision 806. Blob analysis is a convenient way to locate objects even without any previous knowledge of their shape, size and position, to measure the characteristics and discriminate between them. Blobs analyses are segmented from each other and from the background using a variety of threshold operations. Objects are identified through blob analysis using measurements such as: area, perimeter, compactness, roundness, elongation, major axis, minor axis, gray level, colour etc. Based on object analysis, objects are identified and tracked.

The tracking continues for as long as the vessel is in the surveillance range/coverage. Where vessels pass each other, the system in the example embodiment is able to track individual vessels merging (merging procedure 808) and splitting (splitting procedure 810) through the entire range of motion without loss of original tagging identification. The system can also track a vessel that is temporarily occluded by another vessel (typically a larger vessel) through splitting and merging. Once the vessel moves out of current camera coverage, the vessel ID and parameters will be handed over to the next camera coverage for continuous tracking over larger coverage.

A number of zoom in images of each vessel may be taken, for instance for further vessel identification and vessel activity analysis purposes. If the shape of the vessel cannot be determined from the first full vessel image, it can be determined from later images, as the angle of the vessel relative to the camera changes. Based on the shape, size, physical profile or other visual characteristics or combinations thereof, the vessel can be categorised or classified. The images can also be used to determine further information such as width, height, freeboard, structural outline, etc. Based on other aspects of image processing it may also be possible to determine an operating state, or what activity is being carried out, e.g. whether the vessel is underway, planning, adrift, at anchor, fishing, dumping or letting people off, etc.

The vessel can be classified based on the determined shape, length, height and/or other visual or observable/measurable characteristics. If images of the same vessel or of a vessel with the same name are present in the database, image comparisons can be made to determine if it is indeed the same vessel. Even if there are no images available, the shape, length, height or other visual, observable/measurable characteristics of the vessel from the images can be checked to determine if the vessel falls into the same category or classification as that indicated in the database. For instance, the shape may show the vessel to be likely a bulk carrier, and the database entry is checked to see if the name is registered to a bulk carrier. Other checks can be made based on the known and actual lengths, heights, colour schemes, tonnages, etc. Name checks can also be made with lists of vessels that are missing, late or known to have been sunk or destroyed, again to see if there may be something amiss with the vessel in question. Validation can also be made as to the current intended en route or destination for the vessel. Vessel which does not appear on any lists can also be considered of concern. If there is a discrepancy, the relevant authorities can be alerted, for instance to intercept the vessel. These checks can be made based on information in the local databases or else relevant information can be requested from or sent elsewhere for identification and verification, whilst the controller 12 keeps track of the vessel.

Not only may the identity of a vessel be viewed with concern, so may its behaviour. Authorities may be alerted by the system to a vessel displaying anomalous behaviour, whether not normally seen in a particular context, fitting, to some degree of correlation, to one or more predetermined threat scenarios or violating one or more preset rules. The system is trained to establish baseline situations, behaviours and scenarios through processing steady-state/normal real-time video data or by processing corpuses of examples.

Examples of anomalous behaviour include travelling too fast or in the wrong direction or failing to follow navigation instructions or deviating from lane or approaching shore or anchoring at the wrong location or entering restricted zones. For instance the vessel may be getting too close to the shore, possibly for dropping off illegal immigrants. Where the supposed cargo manifest of a vessel is known, this may be considered as well, both for whether the current position and heading is reasonable and for whether the vessel is sitting correctly in the water. The processor may calculate the height of the vessel in the water, from the full vessel images, and possibly known details, and then compare this to where it should be sitting for the current manifest. Moreover, the system can be set to divide a scene into a collection of alarm regions and region borders, each with possibly different alert criteria (such as no entry, no anchorage, maximum speed limit, no entry for vessels beyond certain size etc . . . ) such that any violation by a vessel could trigger an alarm. These regions could be defined by drawing polygons on the electronic navigation chart or waterway image. One or more trip wires which are polylines or straight lines could also be defined directly by drawing polylines or straight lines on the electronic navigation chart or waterway images such that a vessel crossing a trip wire or multiple trip wires in specific sequence could trigger an alert.

More than one zoom camera 24 may be useful for getting better views of the vessels, particularly to determine vessel classes, shapes and names. Alternatively the zoom camera 24 may be separated from scanning camera 22. The scanning camera 22 is set up for a normal or wide view; the zoom camera 24 is set up to zoom in when the vessel passes a particular point and offers the best image which is usually telescopic. Where there are several scanning cameras 22, the central controller 12 keeps track for all the vessels in all the scanned areas to manage a seamless handover of tracked vessels between regions covered by different scanning cameras. A vessel is tracked continuously from when it enters the first region to when it leaves the last region. There preferably are as many scanning cameras as are necessary for a view of every possible vessel leaving, entering or passing through the subject waterway.

The system, in an example embodiment, is also able to perform image fusion including the function to "stitch together" scenes that arise from different scanning cameras to provide a panoramic image view, handling transitions and vessel handover between them, presenting and treating a collection of disparate camera scenes as a single unit (or a fused image scene). In real time panoramic view generation of the waterway under surveillance based on image fusion of scenes captured by different scanning cameras, different camera alignment, different zoom ratio, different focal length, different angle of view, different camera exposures, different image capture times and speeds, different illumination conditions of the different scenes, artefacts caused by moving object, disjointed objects and camera lens distortions etc. should be considered.

Where the cameras solely work in the visible spectrum, the system may be limited to conditions in which there is sufficient light. However, the cameras may additionally or alternatively work in the infra-red wavelengths or be laser based, or there may additionally be infra-red wavelengths or laser based cameras, for use at night, in the presence of fog or mist or other non-ideal (weather, visual) conditions. This may make name reading difficult, so other identification techniques, e.g. based on shape, profile, height, length etc. become more important. An infra-red signature (for instance taken at various ranges), in addition to the other information obtained in the visible spectrum, can help in identifying a vessel, independently of the apparent superstructure (for instance if a pirated ship is disguised). It can also help in determining some problems, for instance by showing a fire aboard or that the engine is dead.

As an overview of a typical embodiment, the system includes: at least one scanning camera (e.g. optical, infrared depending on the environment) to give normal or wide area coverage and vessel detection and tracking; at least one zoom camera to provide telescopic close up image view of vessel and vessel tracking and a computer system with automated advanced video imaging processing algorithms, data and image fusion algorithms and vessel database. The surveillance range/coverage (total area of coverage) of the system is the combined range/coverage of the single or multiple wide area scanning cameras working together with single or multiple zoom cameras. Once a vessel enters the first scanning camera's region, the system automatically detects, tracks and provides the vessel location for activation of the nearest zoom camera for a close up look and image capture of the vessel. The initial scanning camera continues tracking the vessel until the vessel leaves the first scanning camera's coverage and hands over the tracking tasks to the next scanning camera. This continues until the vessel leaves the overall system's surveillance range/coverage.

The application of the system in example embodiments is to detect, classify, identify and/or track vessels, and also has intelligent algorithms to provide vessel information, such as salient observable characteristics (e.g. width, length, height, freeboard, structural outline, shape, physical profile), operating states (e.g. underway, planning, adrift, at anchor, fishing), class/type (e.g. tanker, cruise ship), identification (e.g. name) and to recognise normal and abnormal behaviour and to predict vessel movement and position.

Additional applications within the system may include: AIS validation, post incident analysis, scene/scenario reconstruction, image fusion, panoramic image and waterway view generation for visual display, and the archiving and management of video images for further investigation.

The system described above does not need to replace other system such as radar or transponder based techniques. The system can be used in conjunction with such existing systems. In a further embodiment, there is no scanning camera, as the normal or wide angle views are provided by a radar (or some other appropriate type of sensor), with the vessel location, speed and heading data from the radar used to direct the zoom camera.

The system can be set up as one of high-precision, computer-controlled image detection. After the initial set-up, the system can achieve fully automatic, hands-off operation for the detection, tracking, classification and identification of vessels. The system can be modular in design, resulting in low Mean-Time-To-Repair (MTTR). The system can also use commercial-off-the-shelf equipment, which translates to low capital and replication costs. However, it will also be appreciated that the system may be implemented with different degrees of human input, e.g. using supervised learning techniques or additional human input data entry, instead of necessarily having to implement the system in a fully automatic fashion.

Calibration can be by way of a software assisted one-time calibration for the cameras and lenses, after which only routine cleaning and simple external maintenance may be required. Once installed and calibrated, no further set-up may necessarily be required to use the system. This reduces operational overheads and costs. Because the system may be fully automatic there is less or reduced room for error and there may be no need for an "expert" ship spotter to be on-hand to advise the system operator, or if one is needed, he is needed less frequently.

The invention claimed is:

1. A surveillance system for vessels, the system comprising:
    surveillance means for surveying a waterway;
    vessel detection means for determining the presence and location of a vessel in the waterway based on information from the surveillance means;
    image capturing means for capturing one or more images of the vessel;
    image processing means for processing the images captured by the image capturing means for deriving surveillance data;
    vessel tracking means for tracking individual vessels passing each other while maintaining original tagging identification of said individual vessels;
    wherein the image capturing means captures the vessel images based on information from the vessel detection means, the surveillance data from the image processing means, or both.

2. A system according to claim 1, further comprising tracking means for tracking a vessel's movement through the waterways based on the surveillance data derived by the image processing means.

3. A system according to claim 1, wherein the surveillance data comprises a vessel name extracted from the images of the vessel captured by the image capturing means.

4. A system according to claim 1, wherein the surveillance data comprises a vessel shape/size and/or other vessel characteristics extracted from the images of the vessel captured by the image capturing means.

5. A system according to claim 4, wherein the surveillance data comprises a vessel category/type determined from said vessel shape, height, length and/or other vessel characteristics extracted from the images of the vessel captured by the image capturing means.

6. A system according to claim 1, wherein the surveillance data comprises one or more of a group consisting of a speed, a course, and a trajectory of the vessel extracted from the images of the vessel captured by the image capturing means.

7. A system according to claim 1, wherein the surveillance data comprises behavior data indicative of a behavior of a vessel, including abnormal behavior.

8. A system according to claim 1, further comprising checking means for checking the surveillance data derived by the image processing means against reference data in a database of the system.

9. A system according to claim 1, wherein the surveillance means comprises one or more normal or wide angle scanning cameras and the vessel detection means is operable to determine the presence and location of the vessel based on image processing of images captured by the normal or wide angle scanning cameras.

10. A system according to claim 1, wherein the image capturing means comprises one or more zoom cameras.

11. A system according to claim 1, further comprising position determination means for determining the position of each vessel using data that includes a height of the vessel in water.

12. A system according to claim 1, further comprising behavior alerting means for triggering an alarm upon recognizing anomalous behavior of the vessel based on the surveillance data.

13. A surveillance system for vessels, the system comprising:
   a surveillance device for surveying a waterway;
   a detector for determining the presence and location of a vessel in the waterway based on information from the surveillance means;
   a camera for capturing one or more images of the vessel;
   an image processor for processing the images captured by the camera for deriving surveillance data;
   vessel tracking means for tracking individual vessels passing each other while maintaining original tagging identification of said individual vessels;
   wherein the camera captures the vessel images based on information from the detector, the surveillance data from the image processor, or both.

14. A method of surveillance vessels, the method comprising:
   surveying a waterway;
   determining the presence and location of a vessel in the waterway based on information from the surveillance of the waterway;
   capturing one or more images of the vessel;
   processing the images captured for deriving surveillance data;
   tracking individual vessels passing each other while maintaining original tagging identification of said individual vessels;
   wherein the vessel images are captured based on the determined presence and location, the surveillance data, or both.

15. A method according to claim 14, further comprising tracking a vessel's movement through the waterways based on the derived surveillance data.

16. A method according to claim 14, wherein the surveillance data comprises a vessel name extracted from the images of the vessel.

17. A method according to claim 14, wherein the surveillance data comprises a vessel shape/size and/or other vessel characteristics extracted from the images of the vessel.

18. A method according to claim 17, wherein the surveillance data comprises a vessel category/type determined from said vessel shape and/or other vessel characteristics extracted from the images of the vessel.

19. A method according to claim 14, wherein the surveillance data comprises one or more of a group consisting of a speed, a course, and a trajectory of the vessel extracted from the images of the vessel.

20. A method according to claim 14, wherein the surveillance data comprises behavior data indicative of a behavior of a vessel including abnormal behavior.

21. A method according to claim 14, further comprising checking the surveillance data derived against reference data.

22. A method according to claim 14, wherein the surveying comprises utilizing one or more normal or wide angle scanning cameras and determining the presence and location of the vessel based on image processing of images captured by the normal or wide angle scanning cameras.

23. A method according to claim 14, wherein the capturing of the images of the vessel comprises utilizing one or more zoom cameras.

24. A method according to claim 14, further comprising determining the position of each vessel using data that includes a height of the vessel in water.

25. A method according to claim 14, further comprising triggering an alarm upon recognizing anomalous behavior of the vessel based on the surveillance data.

26. A Non-Transitory data storage medium having stored thereon computer readable code for instructing a computer to execute a method of surveillance vessels, the method comprising:
   surveying a waterway;
   determining the presence and location of a vessel in the waterway based on information from the surveillance of the waterway;
   capturing one or more images of the vessel;
   processing the images captured for deriving surveillance data;
   tracking individual vessels passing each other while maintaining original tagging identification of said individual vessels;
   wherein the vessel images are captured based on the determined presence and location, the surveillance data, or both.

* * * * *